US006745390B1

(12) United States Patent
Reynolds et al.

(10) Patent No.: US 6,745,390 B1
(45) Date of Patent: Jun. 1, 2004

(54) PALETTE MANAGEMENT FOR DISPLAY OF REGULAR GRAPHIC OBJECTS

(75) Inventors: Steven J. Reynolds, Littleton, CO (US); Kenneth F. Carpenter, Jr., Mount Laurel, NJ (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/200,062

(22) Filed: Nov. 25, 1998

Related U.S. Application Data

(60) Provisional application No. 60/077,809, filed on Mar. 12, 1998.

(51) Int. Cl.[7] ............................ H04N 5/445; G06F 3/00; G06F 13/00
(52) U.S. Cl. .......................................... 725/39; 345/602
(58) Field of Search .................. 345/721, 589–604, 345/848, 849, 720, 426, 836; 348/569, 906, 649–654, 576, 577, 552, 589, 600, 708, 714, 715, 717; 725/39; 382/167; 358/518–523

(56) References Cited

U.S. PATENT DOCUMENTS

| 4,853,681 | A | * | 8/1989 | Takashima .................... 345/592 |
|---|---|---|---|---|
| 5,258,747 | A | * | 11/1993 | Oda et al. ..................... 345/602 |
| 5,430,465 | A | * | 7/1995 | Sabella et al. ............... 345/601 |
| 5,548,338 | A | * | 8/1996 | Ellis et al. .................... 348/467 |
| 5,586,236 | A | * | 12/1996 | Quarato ....................... 345/593 |
| 5,627,950 | A | * | 5/1997 | Stokes .......................... 345/591 |
| 5,732,151 | A | * | 3/1998 | Moon et al. .................. 382/167 |
| 5,757,376 | A | * | 5/1998 | Suzuoki et al. .............. 345/581 |
| 5,831,627 | A | | 11/1998 | Cohen ........................... 345/431 |
| 5,844,623 | A | * | 12/1998 | Iwamura ....................... 725/70 |
| 5,867,143 | A | * | 2/1999 | Penna .......................... 345/601 |
| 5,880,744 | A | * | 3/1999 | Bradstreet .................... 345/530 |
| 5,949,409 | A | * | 9/1999 | Tanaka et al. ............... 345/549 |
| 5,978,043 | A | * | 11/1999 | Blonstein et al. ............ 348/564 |
| 6,005,601 | A | * | 12/1999 | Ohkura et al. .............. 348/906 |
| 6,011,540 | A | * | 1/2000 | Berlin et al. ................. 345/601 |
| 6,122,012 | A | * | 9/2000 | Segman ....................... 348/576 |
| 6,172,681 | B1 | * | 1/2001 | Ueda ............................ 345/589 |
| 6,181,333 | B1 | * | 1/2001 | Chaney et al. .............. 345/158 |
| 6,362,829 | B1 | * | 3/2002 | Omvik et al. ............... 345/593 |
| 6,518,981 | B2 | * | 2/2003 | Zhao et al. .................. 345/764 |

OTHER PUBLICATIONS

"Getting Started With Prevue Interactive—The On–Screen Program Guide for DCT 1000," Prevue Interactive (2/97).
"Prevue Interactive—Reference Guide DCT 1000—Version 1.2," Prevue Networks (1996).
"Prevue Interactive—Installer's Guide—DCT 1000," Prevue Networks, Inc. (1996).

* cited by examiner

*Primary Examiner*—Vivek Srivastava
*Assistant Examiner*—Jason Chung
(74) *Attorney, Agent, or Firm*—Fish & Neave

(57) ABSTRACT

A system and method are provided for implementing palette management for displaying regular graphic objects on a video monitor. A plurality of sets of three-dimensional color components for each of a plurality of gradients is determined. Each of the plurality of sets of three-dimensional color components is stored in a respective one of a plurality of color look up tables. A processor determines which one of the plurality of color look up tables to display for any given scan line on the video monitor. A selected one of the plurality of sets of three-dimensional color components is retrieved from one of the plurality of color look up tables. Using the selected one of the plurality of sets of three-dimensional color components, the video monitor is caused to illuminate at least one pixel of the respective scan line.

18 Claims, 10 Drawing Sheets

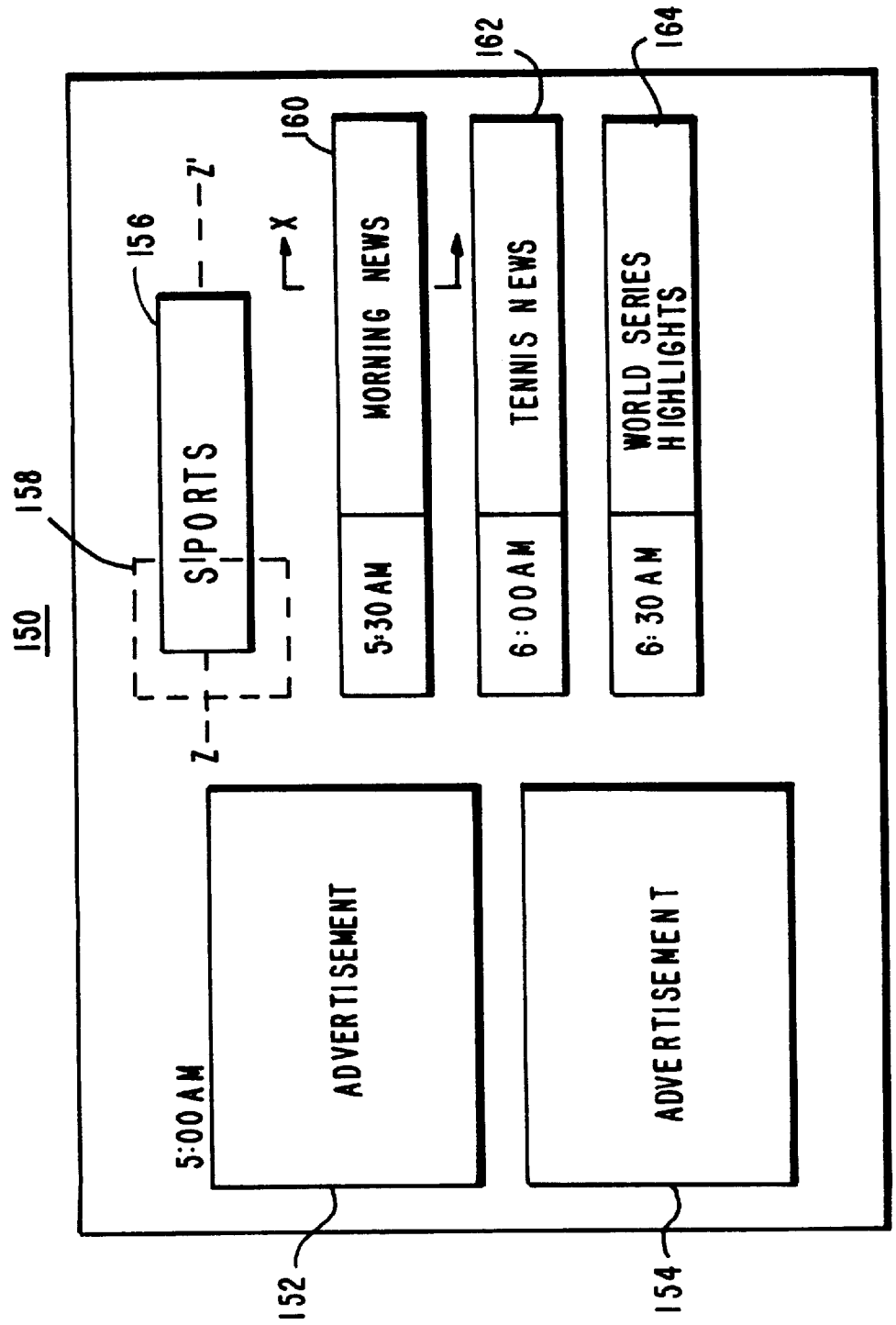

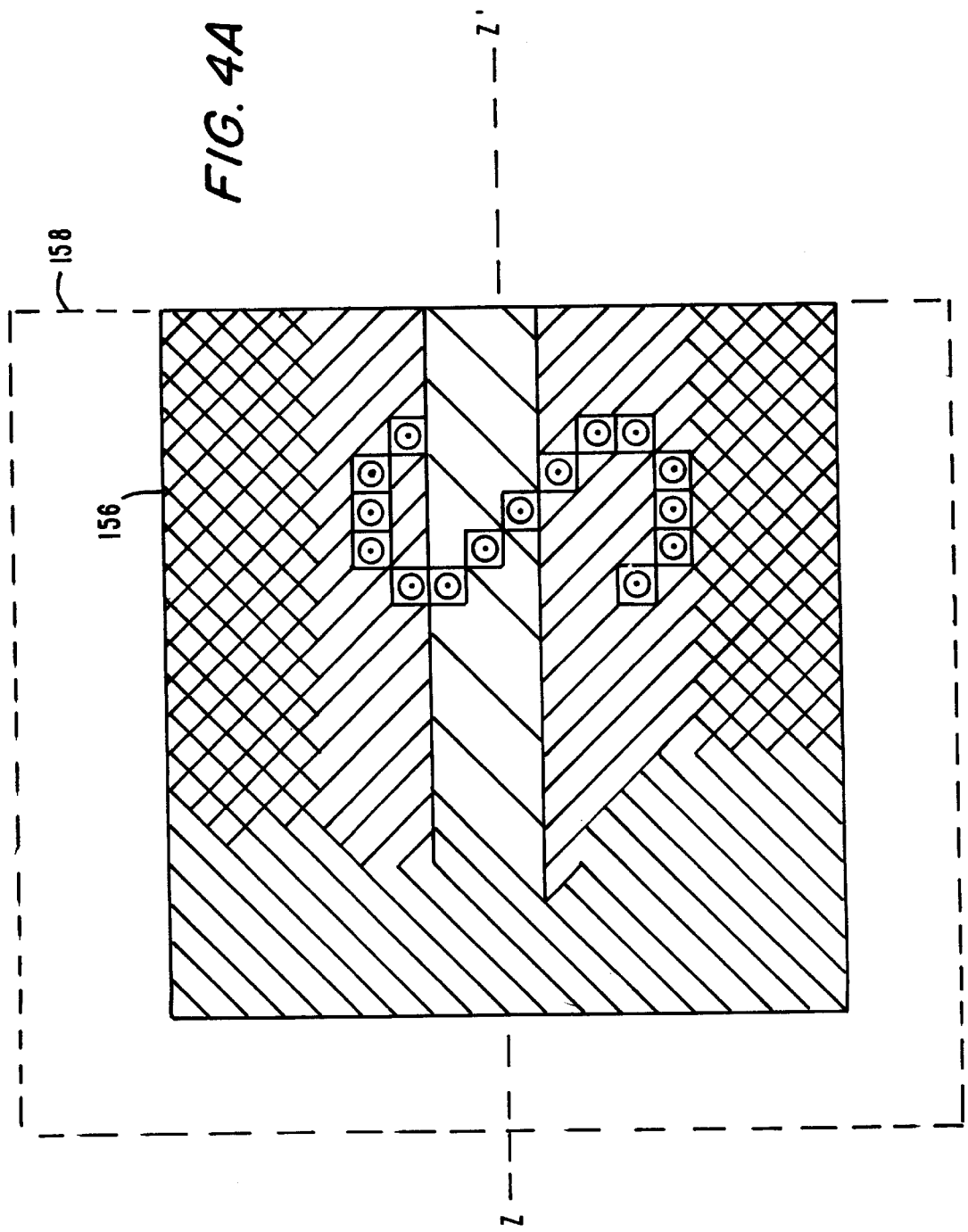

PALETTE MANAGEMENT FOR DISPLAY OF REGULAR GRAPHIC OBJECTS

This application claims the benefit of U.S. provisional patent application No. 60/077,809, filed on Mar. 12, 1998.

BACKGROUND OF THE INVENTION

This invention relates generally to applications which use computer graphics techniques to display graphic objects on a video monitor. More particularly, this invention relates to a system and method for palette management for displaying regular graphic objects.

During the past decade, the graphics capabilities of personal computers, set-top boxes and home video game units have rapidly improved. Applications developers naturally have taken advantage of these improvements by designing increasingly sophisticated graphically oriented applications, such as video games, program guides and multimedia which rely heavily on computer graphics techniques to display graphic objects on a video monitor. Such graphically oriented computer applications running on modern hardware platforms are now capable of displaying and animating extremely complex graphical images. These applications can generate graphic objects having a realistic quality that was previously difficult to achieve.

As the quality of graphically oriented computer applications has improved, so has the ability of many users of such applications to discriminate between poor quality and high quality animation. Indeed, graphics quality is believed to contribute significantly to the commercial acceptance of many video games, program guides and multimedia applications. Accordingly, computer applications developers have continued to explore ways in which graphics quality can be improved.

As a particular application, consider the increasing importance of television program guides. Cable, satellite, and broadcast television systems provide viewers with a large number of television channels. Viewers have traditionally consulted printed television program schedules to determine the programs being broadcast at a particular time.

Passive television program guides provide a scrolling or paged list of television program listings on a dedicated television channel. A television user may view the television program listings by tuning to the dedicated channel. The upper portion of a passive program guide display may be used to display advertising videos and associated text descriptions. The content of the text descriptions may be targeted toward particular regions. Passive television program guides are not capable of providing the user with any interactive features.

More recently, interactive electronic television program guides have been developed that allow television program information to be displayed on a viewer's television. Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listing by theme (e.g., movies, sports, etc.) or by title (i.e., alphabetically). A user may view additional information on a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Video monitors used in conjunction with personal computers, set-top box equipment for television program guides and video game equipment for video games generally have an array of pixels which are selectively illuminated to display images on the screen. In order to display an object at a particular location on the screen, video display circuitry in a computer system, set-top box, or video game system (herein after sometimes generically referred to as a computer system) connected to the video monitor selects a subset of pixels from the array, and causes the video monitor to illuminate each pixel in the subset using a color that is desired for the object being displayed.

Many graphics applications (such as television program guides and video games) which run on set top boxes and personal computers are limited to an eight-bit color palette (i.e., 256 colors) or even less. In many instances, the size of the color look-up table ("CLUT") of the graphics display hardware limits the number of colors that may be displayed on a single scan line to as few as sixteen. Although a larger number of colors may be displayed on a single screen, only those colors contained in the relatively small CLUT can be displayed on any given single line.

One solution to the problem caused by the limited number of colors that may be displayed on a single scan line is to analyze the image to be displayed and generate a CLUT for each line based on only the colors present in the image. Such an approach involves generating and storing a CLUT for each scan line and is possible when displaying regular objects, such as three-dimensional tubes. A regular object is any screen graphic having a describable geometric shape (i.e., a vertical center which can be either calculated or approximated). However, the number of CLUTs is often quite large and difficult to manage.

It would therefore be desirable to provide a system and method for palette management for displaying regular graphic objects which uses a relatively small number of CLUTs.

SUMMARY OF THE INVENTION

The above-identified difficulties associated with displaying regular objects on a video monitor are overcome by this invention. More particularly, this invention provides a system and method for palette management for displaying regular graphic objects which uses a relatively small number of CLUTs.

The system and method of the present invention advantageously can be implemented using readily available, conventional hardware that is capable of executing graphically oriented computer applications. The system preferably includes a microprocessor (or micro-controller), random access memory ("RAM"), and a video monitor (e.g., a computer monitor or television). In addition, the system can include a removable media input/output ("I/O") device (e.g., a floppy disk drive, tape drive, compact disk read-only memory ("CD-ROM") drive, etc.), a user input device (e.g., a keyboard, mouse, microphone, joystick, trackball, etc.), a video controller (e.g., a graphics card), and a hard disk drive. Alternatively, the principles of the present invention may be implemented on other suitable hardware platforms such as television program guide systems or home video game systems.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout.

FIG. 3 is an illustrative display provided by a television program guide in accordance with the present invention.

FIG. 4A depicts a portion of the display of FIG. 3.

DETAILED DESCRIPTION OF THE PREFERRED EMBODIMENTS

Figure 1:
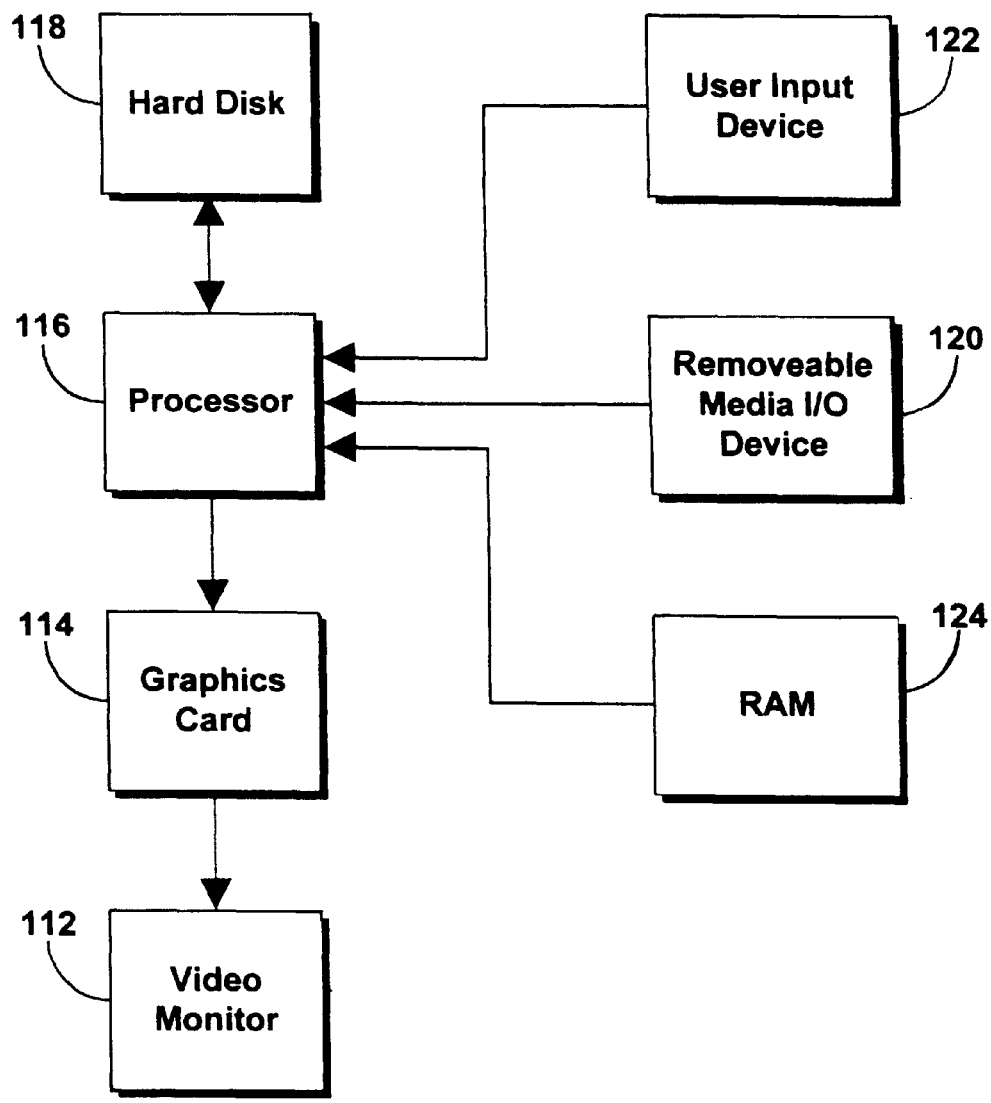
FIG. 1 is a simplified block diagram representing a hardware platform that may be used in accordance with the principles of the present invention.

Referring to FIG. 1, a simplified block diagram is shown which represents a computer system 110 that may be used to implement a system and method for palette management for displaying regular graphic objects which uses a relatively small number of CLUTs in accordance with the principles of the present invention. The hardware components of computer system 110 may be conventional components that are commonly found in personal computer or set-top box systems. The system 110 has a video monitor 112, which may be a cathode ray tube ("CRT"), plasma screen, liquid crystal display ("LCD") or other suitable video monitor. The video monitor 112 can also be a conventional television set. The video monitor 112 may be a conventional computer monitor having a resolution of, e.g., at least 480×640 pixels. Such a video monitor 112 may be driven by a conventional graphics card 114 that is capable of supporting the simultaneous display of at least 256 colors.

The computer system 110 is controlled by a processor 116. The processor 116 is preferably a microprocessor that has sufficient computational power to cause the graphics card 114 to display animated objects on the video monitor 112. The invention can be implemented using a minimum of processor power (such as that provided by most microprocessors or microcontrollers designed since the 1970's) that implements addition and memory access. An example of a suitable microprocessor is the Motorola 68331® microprocessor.

The computer system 110 also includes components for receiving and storing information such as application programs and data. The system 110 may include, for example, a hard disk drive 118 and at least one removable media I/O device 120. Devices which are suitable for use as the removable media I/O device 120 may include, for example, a floppy disk drive, a tape drive or a compact disk read-only memory ("CD-ROM") drive. The removable media device 120 may be used by the system 110 to receive graphically oriented applications programs, such as video games and multimedia applications, which include instructions for generating the display of animated objects on the video monitor 112. These application programs may be loaded into the hard disk 118 in order to improve the speed of program execution.

The computer system 110 also preferably includes at least one user input device 122. Devices which are suitable for use as the user input device 122 include, for example, a keyboard, mouse, trackball, joystick or microphone. The processor 116 is configured to receive instructions from the user input device 122, which may include instructions that cause an application program being executed by the processor 116 to move an object displayed on the video monitor 112 from one location to another, or instructions to change the background detail displayed on the video monitor 112.

The computer system 110 also includes random access memory ("RAM") 124. The RAM 124 is used to store at least portions of an application program being executed by the processor 116, as well as data that may be generated or used by the processor 116 while executing an application program. In accordance with the principles of this invention, the RAM 124 is also used to store information that allows the computer system 110 to implement a system and method for palette management for displaying regular graphic objects which uses a relatively small number of CLUTs.

Although the preferred hardware platform for implementing the invention has been described as a personal computer, it should be understood that the invention can also be implemented on other hardware platforms, such as a television program guide system or a conventional home video game platform. It should also be understood that variations to the block diagram shown in FIG. 1 may be made without departing from the spirit of the invention. For example, the functions performed by both the graphics card 114 and the processor 116 may be performed by a single integrated circuit. Alternatively, many of the processing steps described below as being performed by the processor 116 may instead be performed by a video display processor provided on the graphic card 114. Moreover, the graphic card 114 may include memory that may be used to store some or all of the data described below as being stored in the RAM 124.

Figure 2:
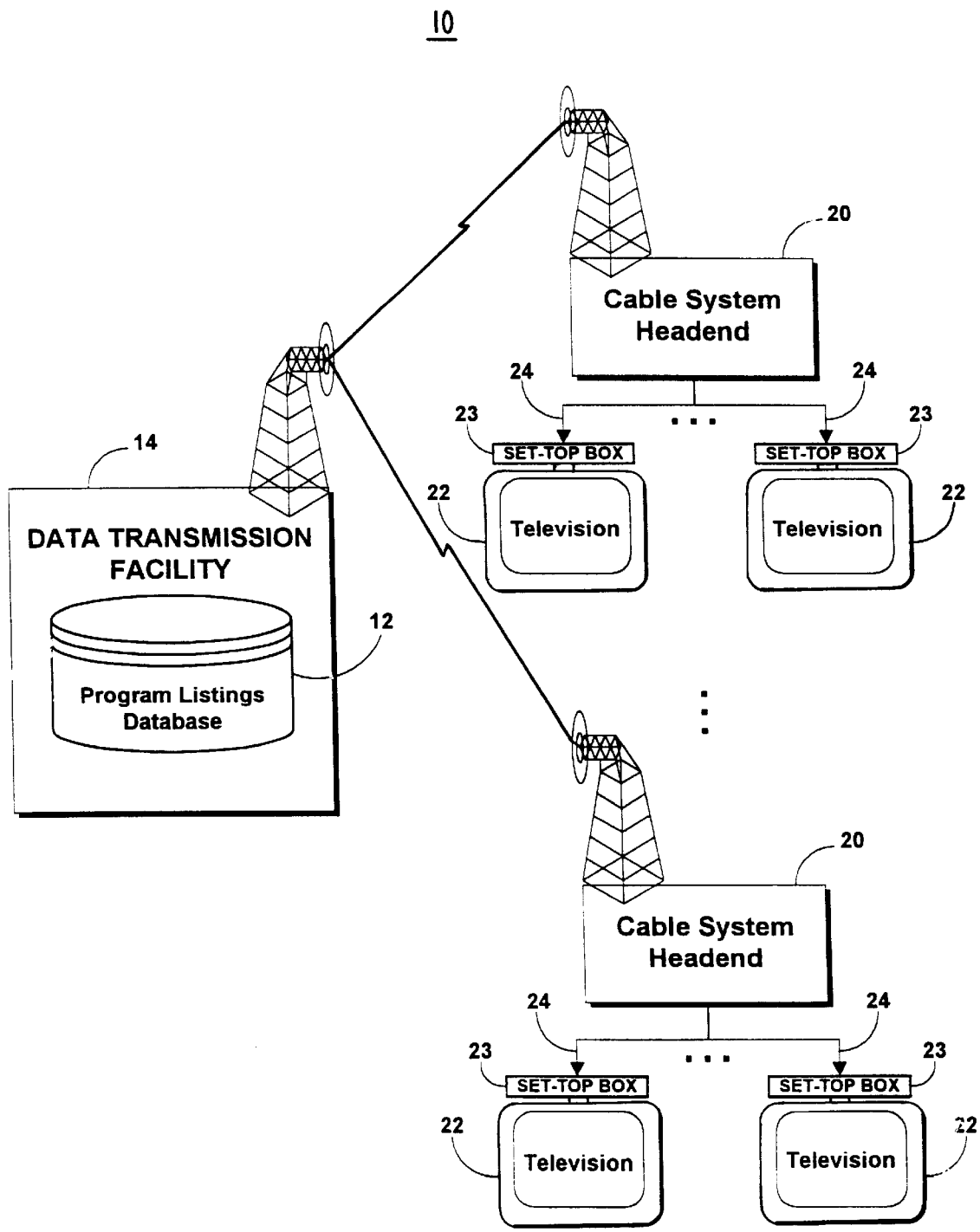
FIG. 2 is a diagram of an arrangement for providing a television program guide channel that may be used in accordance with the principles of the present invention.

An interactive television program guide system 10 that may be used with the present invention is shown in FIG. 2. Data for television program listings such as channel, title, and broadcast time information is stored in a program listings database 12 in a data transmission facility 14. Program listings may be distributed to multiple cable system headends 20 via satellite or other suitable link. The cable system head ends 20 are typically in different geographic regions. The cable system head end 20 in each region distributes the program listings to set-top boxes 23 via cable links 24 or other suitable communications paths. An interactive television program guide implemented on set-top box 23 displays the program listings using various program guide screens.

The layout of a typical program guide screen is shown in FIG. 3. The program guide system of FIGS. 2 and 3 is representative of the type of system to which the present invention can be applied. Other suitable systems to which the invention may be applied include personal computer systems and video game systems.

As shown FIG. 3, program guide screen 150 may include various areas 152 and 154 for video (used for advertisements, for example), and various tubes 156, 160, 162, and 164 for display of information. Tubes 156, 160, 162, and 164 are all example of regular graphic objects. As shown in FIG. 3, tube 156 includes the banner "SPORTS" indicating the kind of channel or channels that the program guide screen 150 is directed to. Other tubes, for example tube 160, include starting times and program titles. The information included in the tube of FIG. 3 is only representative and may vary, depending on the application of the program guide.

An enlarged portion (corresponding to the box with broken lines labeled 158) of tube 156 of FIG. 3 is shown in FIG. 4A. Specifically, FIG. 4A shows the letter "S" and a portion of the background of tube 156. The vertical center (indicated by line Z–Z' as shown in FIGS. 3 and 4A) of the regular object (here, tube 156) is used when applying shades of grey scale or color to the surface of the object.

Figure 4B:
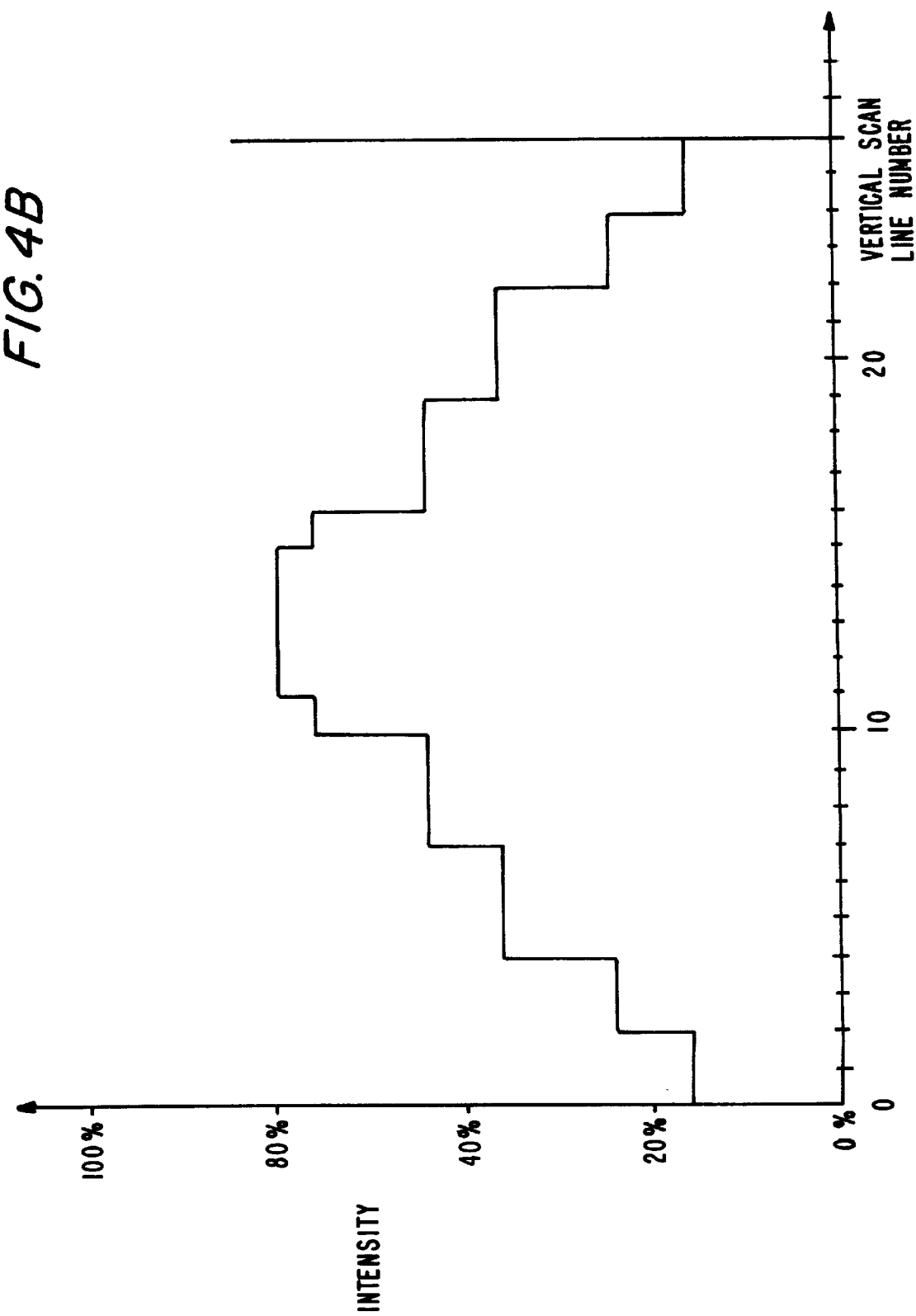
FIG. 4B shows how intensity can vary vertically on a pixel-by-pixel basis.
Figure 5:
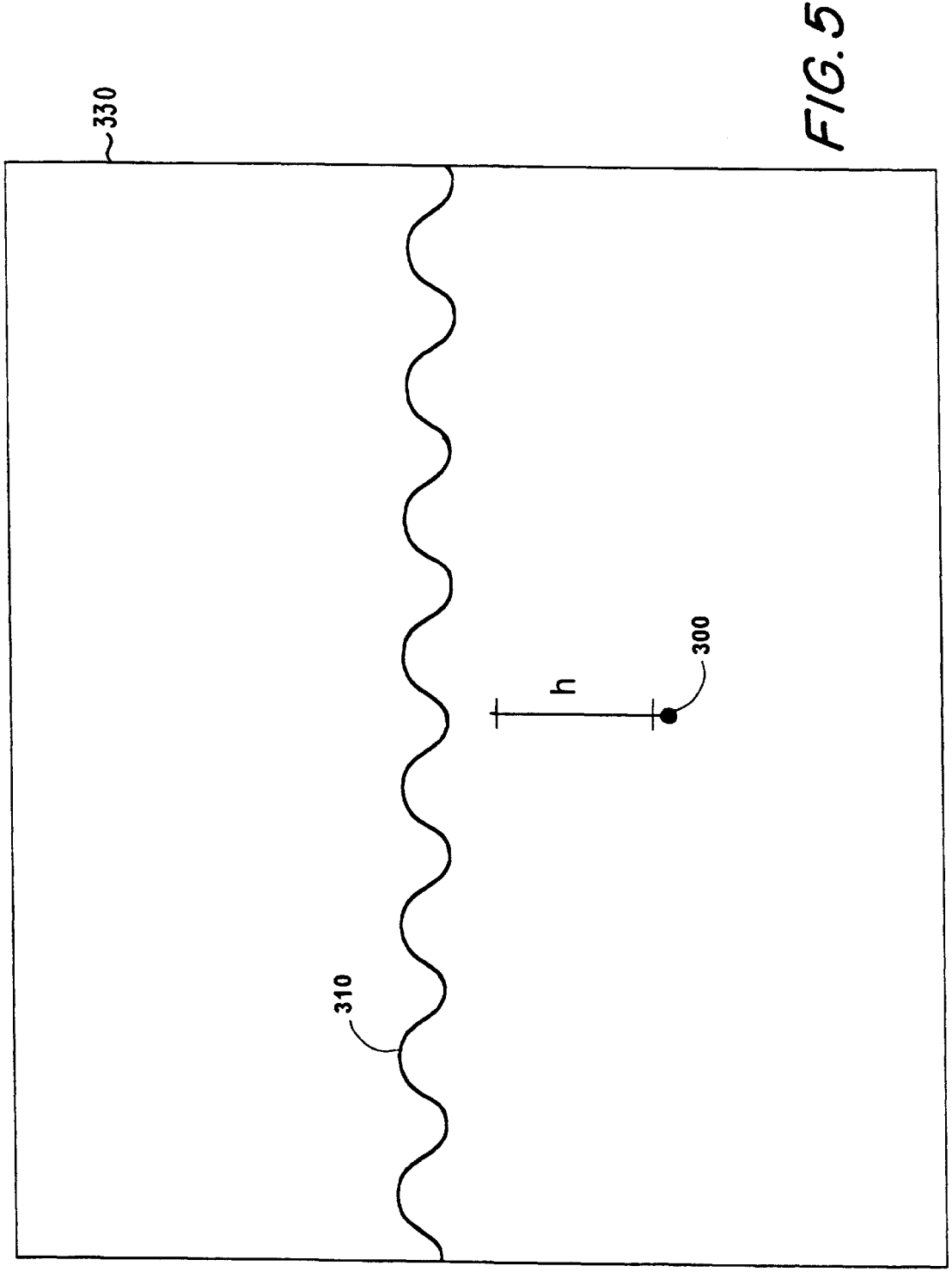
FIG. 5 shows a typical horizontal scan line along the portion of the display of FIG. 3 shown in FIG. 4A.

The manner in which the present invention implements a system and method for palette management for displaying on the video monitor regular graphic objects which uses a relatively small number of CLUTs may be understood by reference to the screen example shown in FIGS. 4A and 4B and a typical horizontal scan line shown in FIG. 5. It should be noted, however, that the screen example of FIGS. 4A and 4B depicts only a small portion of a full screen display that may appear at any given time on the video monitor 12 (FIG. 1). It should further be noted that, although the image shown in FIG. 4A is in grey-scale, the principles of the invention apply equally as well to color images, and indeed the invention offers significant advantages when used in connection with color images. The various shades of grey shown in FIG. 4A may thus be considered different colors. Finally, it should be noted that although the following explanation proceeds in reference to the computer system of FIG. 1, the system and method of the present invention are equally applicable to computer graphics systems such as set-top boxes with television program guides and video game systems.

Although a cylindrical tube (tube 156 in FIGS. 3 and 4A) is used to explain the invention, the invention may be applied to any other regular graphic shape. Examples of regular graphic shapes include squares, rectangles, circles, ellipses, cylinders, tubes (which are cylinders with rounded ends like hot dogs; cylinders have flat ends), hexagons, octagons, n-sided regular closed shapes, etc. In order to display a three-dimensional cylindrical tube on a given two-dimensional display, different shades of colors are used at different distances from the tube's central axis Z–Z'. For example, to draw a cylindrical tube of a chosen color (for example, purple) and create the effect of a light source directly in front of the tube (i.e., above the page in FIGS. 3 and 4A), the lightest shades are used along the central axis and the darkest are used along the edges. In most cases, a relatively small number (for example, six) of shades of the chosen color need to be used. The darkest shade will be drawn along the top and bottom edges. The lightest shade will be used in several center scan lines. Other shades will be used in between. One CLUT will be used to represent each shade. Thus, in this example, only six CLUTs need to be stored. As shown in FIG. 4B, however, intensity (i.e., grey level values) can vary vertically on a pixel-by-pixel basis (i.e., according to vertical scan line number).

The color values for each CLUT are preferably in a linear ramp from the lightest to the darkest shades. This ramp should preferably be done in the three dimensions (red, green, and blue) of the RGB values. For example, the red component of the color for the "j"th CLUT is given by the following expression:

$$r[j] = \frac{(j-1)}{(M-1)} \times (r[M] - r[1]) + r[1]$$

where "M" is the total number of CLUTs used for gradients, "j" is the particular CLUT index (ranging from 1 to M), and "r[j]" is the red component of the particular color within the "j"th CLUT. Similar expressions are used to generate the blue and green components of the color.

An algorithm is used to determine which CLUT to use for any given scan line. The CLUTs are assigned based on the distance from the vertical center of the object—hence, the importance of using regular shapes with centers that are easily calculated or approximated. Because a cylinder is circular in its axial direction, a circle equation $$(h/N)^2 + (p/Q)^2 = 1$$

is used as the determining algorithm, where "h" (shown in FIG. 5) is the distance of a typical horizontal scan line 310 above or below the center 300 of the tube's location, "N" is the number of scan lines from the center 300 to either edge of the display screen 330, "p" is the index in the CLUT table for this scan line, and "Q" is the total number of CLUTs used for cylinder gradients. This equation may be solved for "p" to determine which CLUT to use for any given scan line. The application can derive the solution of "p" by calculating it for each line or by performing a table lookup.

Figure 6:
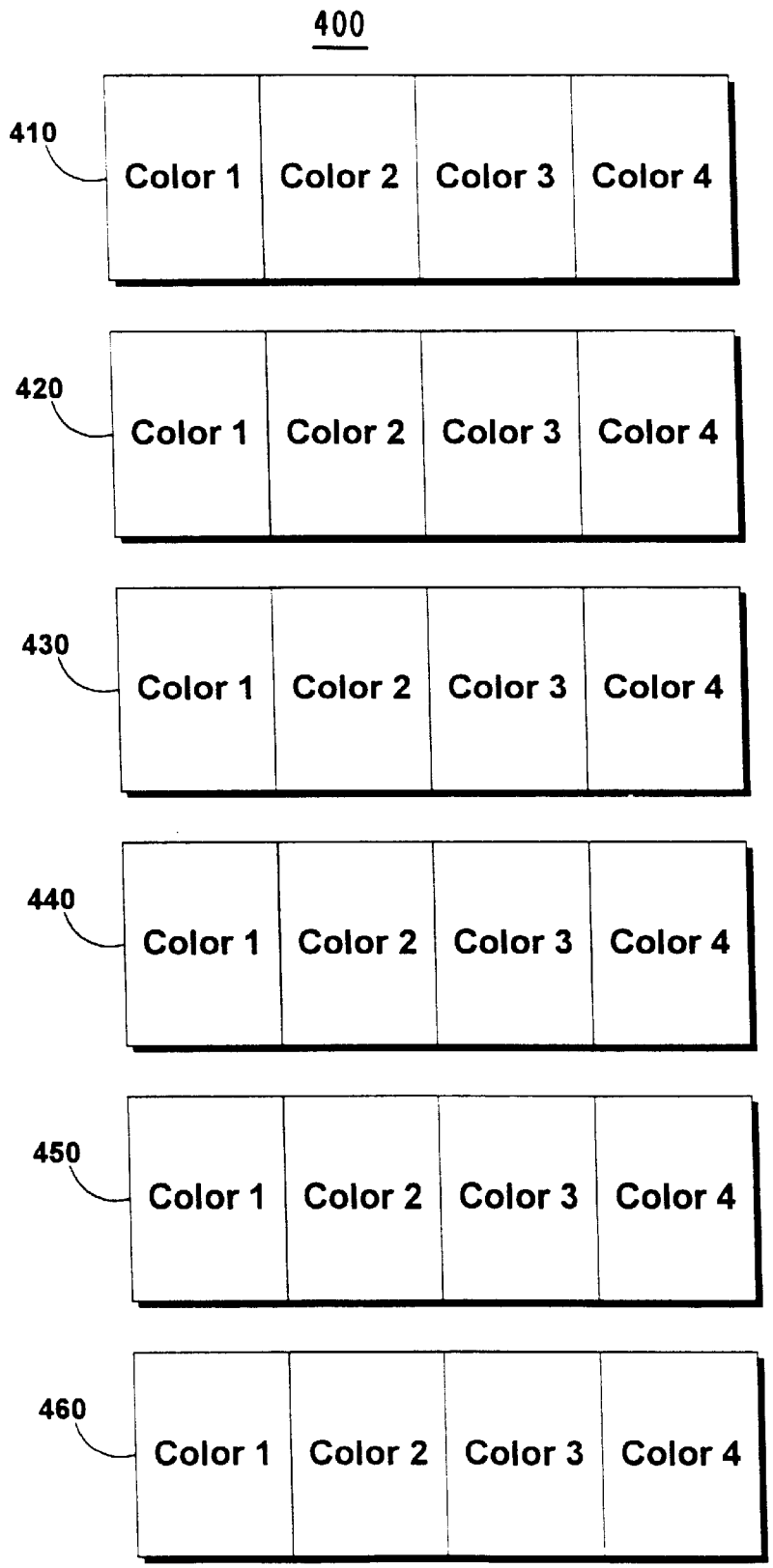
FIG. 6 shows a set of color lookup tables generated in accordance with the principles of the present invention.
Figure 9:
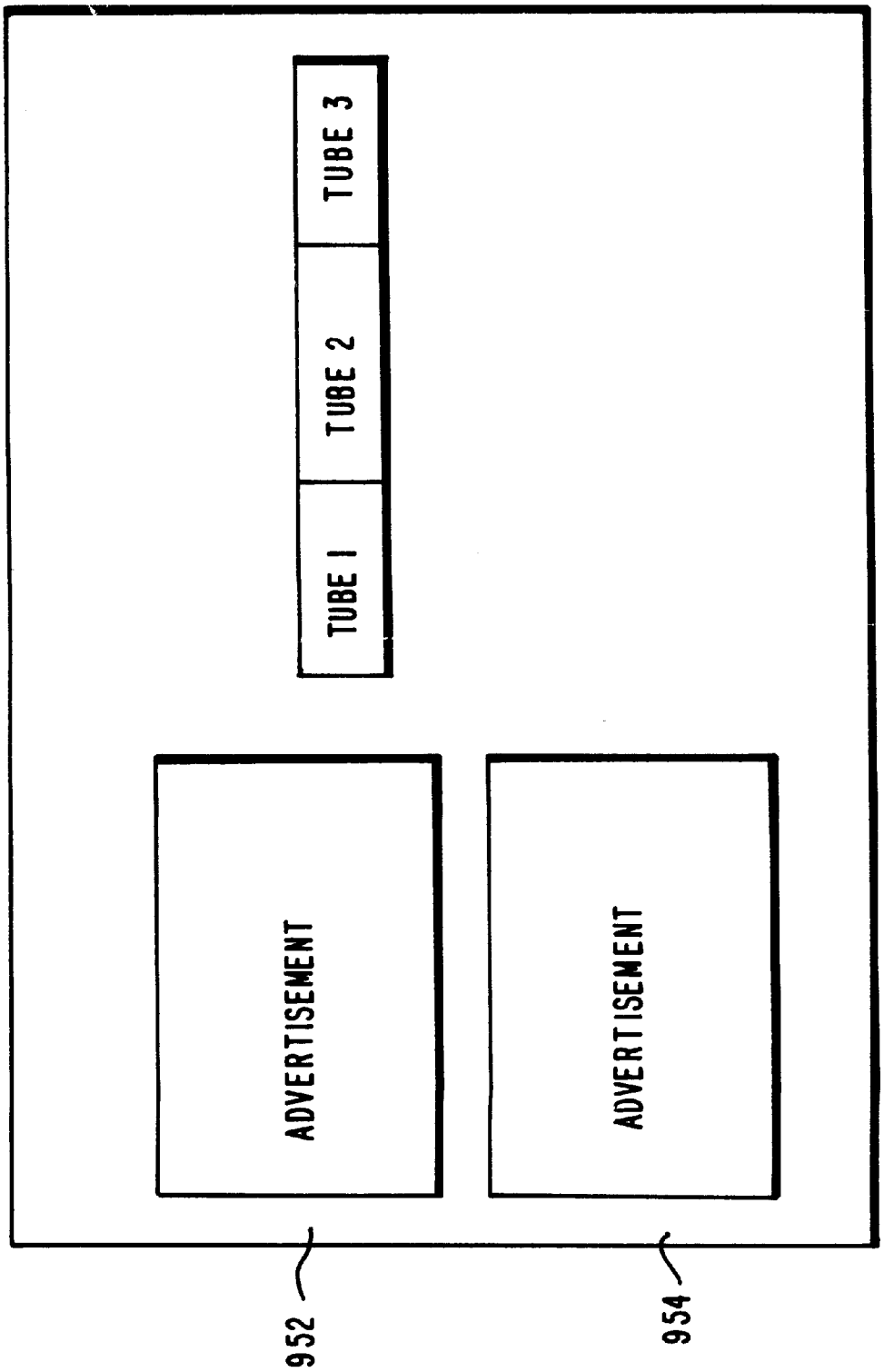
FIG. 9 is an illustrative display provided by a television program guide in accordance with the present invention.

Another advantage of this invention is the ability to handle different colored objects or cylindrical tubes using a single set 400 of CLUTs as shown in FIG. 6, rather than one CLUT for each color. For example, consider a single set 400 of CLUTs (410, 420, 430, 440, 450, and 460) as shown in FIG. 6. Each CLUT (410, 420, 430, 440, 450, and 460) might have red as color 1, blue as color 2, green as color 3, and purple as color 4. The six CLUTs would then have the same color in the same position in the CLUT table for the same CLUT index. The first CLUT 410 has the lightest shade of each of the four colors. The second CLUT 420 has the next lightest shade of each of the four colors. The third CLUT 430 through the sixth CLUT 460 have successively darker shades of each of the four colors. As long as the axes of the regular graphic objects (here, cylindrical tubes) are vertically aligned, multiple tubes of different colors may be lined up horizontally on the display, as shown in FIG. 9. In particular, as shown in FIG. 9, program guide screen 950 may include various areas 952 and 954 for video (as in FIG. 3) and multiple tubes (for example, tube 1, tube 2 and tube 3) of selected shades of selected different colors (for example, light red, dark blue and light orange). Tube 1, tube 2 and tube 3 are all regular graphic objects with vertically aligned axes.

Figure 7:
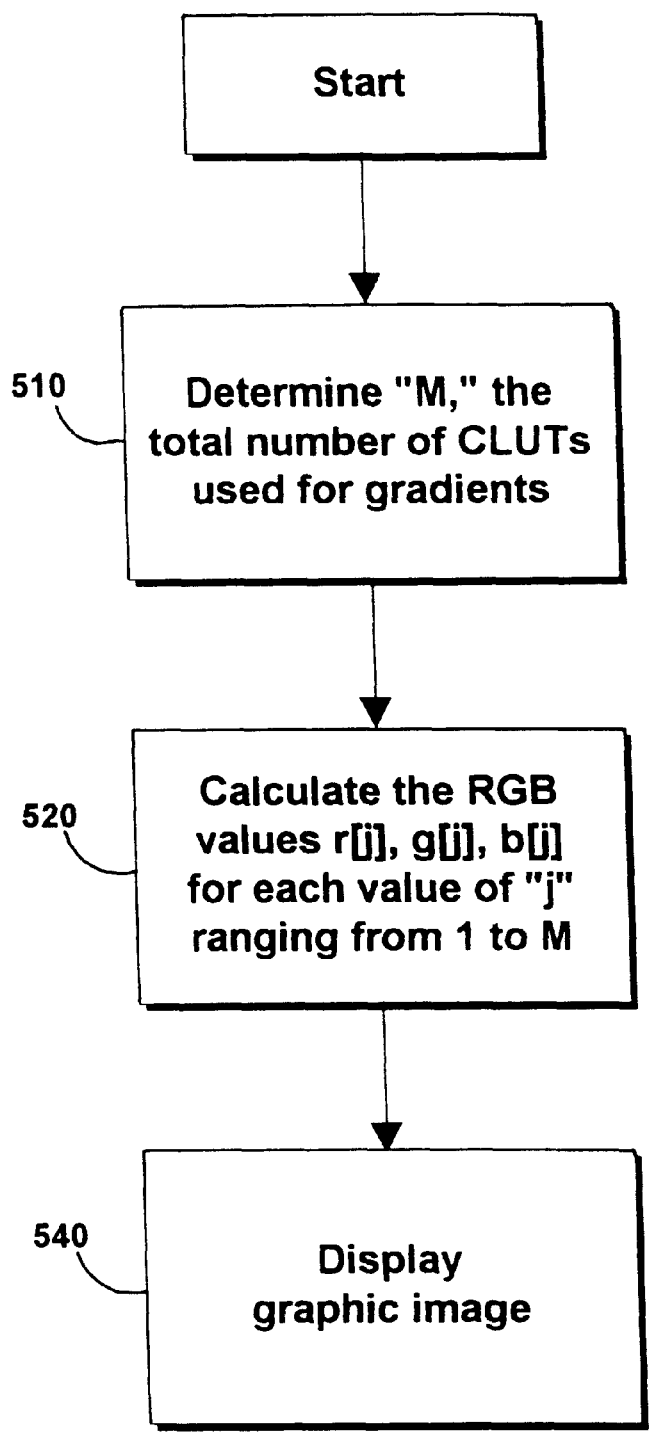
FIG. 7 is a logic flow diagram which represents a sequence of steps performed by a processor for displaying a regular graphic object in accordance with the principles of the present invention.

Referring now to FIG. 7, a logic flow diagram is described which represents a sequence of steps performed by a processor (for example, processor 16 of FIG. 1) to generate the CLUTs for displaying a regular graphic object in accordance with the principles of the present invention. Each CLUT is preferably stored in RAM 24 (FIG. 1). The processor 16 (FIG. 1) preferably generates the table only once each time the user invokes an application program that utilizes the principles of this invention. In the preferred embodiment described herein, each CLUT is not excessively large. However, if the creation of this table is deemed too slow for a particular application (e.g., if a larger table is desired), it may be stored in a file and loaded into the RAM 24 (FIG. 1) from that file when needed.

As shown in FIG. 7, the processor begins in step 510 by determining "M," the total number of CLUTs used for gradients. Color coordinate values (for example, RGB values, r[j], g[j], b[j]) are calculated for each value of "j" ranging from 1 to M in step 520. Finally, the graphic image is displayed in step 540.

Figure 8:
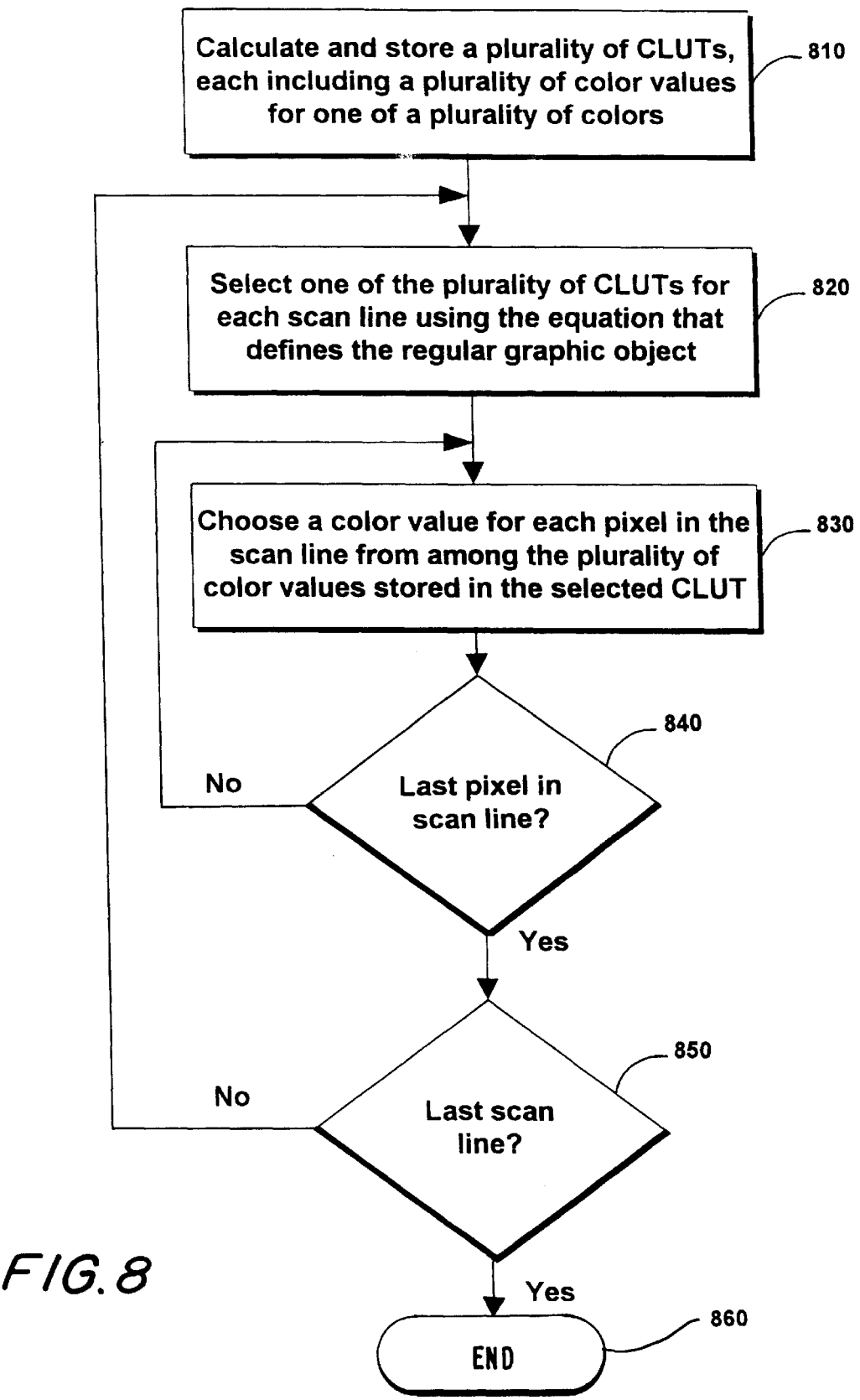
FIG. 8 is a logic flow diagram which represents a sequence of steps performed by a processor for displaying a regular graphic object in accordance with the principles of the present invention.

The process of calculating color coordinate values is shown in FIG. 8. In an initial step 810, a plurality of CLUTs is calculated and stored. Each CLUT includes a plurality of color values for one of a plurality of colors. For each scan line, in step 820, one of the plurality of stored CLUTs is chosen, using the equation that defines the regular graphic object. Then, for each pixel in the scan line, in step 830, a color is chosen from among the plurality of color values stored in the CLUT selected in step 820. At step 840, the process determines whether the last pixel in the scan line has been selected. If the last pixel in the scan line has not been selected, the process returns to step 830. If the last pixel in the scan line has been selected, the process moves to step 850 to determine whether the last scan line has been selected. If the last scan line has not been selected, the process returns to step 820. If the last scan line has been selected, the process ends at step 860.

What is claimed is:

1. A graphics system including a video monitor having a plurality of scan lines each having a plurality of pixels for displaying a graphical image, comprising:
    a processor for generating a plurality of sets of three-dimensional color components for each of a plurality of gradients; and
    a memory associated with the processor for storing each of the plurality of sets of three-dimensional color components in a respective one of a plurality of color look up tables, wherein each of the plurality of color look up tables is associated with a respective one of the plurality of gradients,
    wherein the processor determines which one of the plurality of color look up tables to use in displaying the graphical image for any given scan line on the video monitor, retrieves the set of three-dimensional color components from that color look up table, and uses the retrieved set of three-dimensional color components in directing the video monitor to illuminate at least one pixel of the given scan line.

2. The graphics system of claim 1 wherein the video monitor comprises a computer monitor.

3. The graphics system of claim 1 wherein the video monitor comprises a television.

4. The graphics system of claim 1 further comprising a set-top box and a program guide.

5. A method for displaying a graphical image using a graphics system including a video monitor having a plurality of scan lines each having a plurality of pixels, comprising:
    generating a plurality of sets of three-dimensional color components for each of a plurality of gradients;
    storing each of the plurality of sets of three-dimensional color components in a respective one of a plurality of color look up tables, wherein each of the plurality of color look up tables is associated with a respective one of the plurality of gradients;
    determining which one of the plurality of color look up tables to use in displaying the graphical image for any given scan line on the video monitor;
    retrieving the set of three-dimensional color components from the color look up table previously determined; and
    illuminating at least one pixel of the given scan line using the retrieved set of three-dimensional color components to direct the video monitor.

6. The method of claim 5 wherein the video monitor comprises a computer monitor.

7. The method of claim 5 wherein the video monitor comprises a television.

8. The method of claim 5 wherein the graphics system includes a set-top box and a program guide.

9. The method of claim 5 wherein the least one pixel of the given scan line is part of a regular graphic object.

10. The method of claim 9 wherein the regular graphic object is a cylinder.

11. An interactive program guide system in which television program guide information is provided to a distribution facility, comprising:
    a video monitor having a plurality of scan lines each having a plurality of pixels for displaying a graphical image;
    a processor for generating a plurality of sets of three-dimensional color components for each of a plurality of gradients;
    a memory associated with the processor for storing each of the plurality of sets of three-dimensional color components in a respective one of a plurality of color look up tables, wherein each of the plurality of color look up tables is associated with a respective one of the plurality of gradients,
    wherein the processor determines which one of the plurality of color look up tables to use in displaying the graphical image for any given scan line on the video monitor, retrieves the set of three-dimensional color components from that color look up table, and uses the retrieved set of three-dimensional color components in directing the video monitor to illuminate at least one pixel of the given scan line.

12. The interactive program guide system of claim 11 wherein the video monitor comprises a computer monitor.

13. The interactive program guide system of claim 11 wherein the video monitor comprises a television.

14. A method for providing an interactive program guide in which television program guide information is provided to a distribution facility and a graphical image is displayed using a graphics system including a video monitor having a plurality of scan lines each having a plurality of pixels, comprising the steps of:
    generating a plurality of sets of three-dimensional color components for each of a plurality of gradients;
    storing each of the plurality of sets of three-dimensional color components in a respective one of a plurality of color look up tables, wherein each of the plurality of color look up tables is associated with a respective one of the plurality of gradients;
    determining which one of the plurality of color look up tables to use in displaying the graphical image for any given scan line on the video monitor;
    retrieving the set of three-dimensional color components from the color look up table previously determined; and
    illuminating at least one pixel of the given scan line using the retrieved set of three-dimensional color components to direct the video monitor.

15. The method of claim 14 wherein the video monitor comprises a computer monitor.

16. The method of claim 14 wherein the video monitor comprises a television.

17. The method claim 14 wherein the least one pixel of the given scan line is part of a regular graphic object.

18. The claim 17 wherein the regular graphic object is a cylinder.

* * * * *